(12) United States Patent
Kumahara et al.

(10) Patent No.: US 10,670,478 B2
(45) Date of Patent: Jun. 2, 2020

(54) TEMPERATURE MEASUREMENT CIRCUIT AND METHOD, AND MICROCOMPUTER UNIT

(71) Applicant: Renesas Electronics Corporation, Tokyo (JP)

(72) Inventors: Chiaki Kumahara, Tokyo (JP); Tetsuhiro Koyama, Tokyo (JP); Masaaki Hirano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 309 days.

(21) Appl. No.: 15/795,112

(22) Filed: Oct. 26, 2017

(65) Prior Publication Data
US 2018/0156675 A1 Jun. 7, 2018

(30) Foreign Application Priority Data
Dec. 5, 2016 (JP) .................................. 2016-235730

(51) Int. Cl.
| | |
|---|---|
| *G01K 15/00* | (2006.01) |
| *G01K 7/00* | (2006.01) |
| *G01K 1/00* | (2006.01) |
| *G01K 1/14* | (2006.01) |
| *G01K 7/16* | (2006.01) |
| *G01K 7/32* | (2006.01) |

(52) U.S. Cl.
CPC ............. *G01K 15/007* (2013.01); *G01K 1/14* (2013.01); *G01K 7/16* (2013.01); *G01K 7/32* (2013.01)

(58) Field of Classification Search
USPC .............................. 374/1, 183, 170, 166, 142
See application file for complete search history.

(56) References Cited

U.S. PATENT DOCUMENTS

| | | | | |
|---|---|---|---|---|
| 5,638,414 | A * | 6/1997 | Enokido | G21C 17/07 376/251 |
| 2003/0034848 | A1* | 2/2003 | Norman | H03K 3/011 331/46 |
| 2014/0140364 | A1* | 5/2014 | Charles | G01K 15/005 374/1 |
| 2018/0183442 | A1* | 6/2018 | Pavao Moreira | H03L 1/02 |
| 2018/0198451 | A1* | 7/2018 | Jung | H03L 1/022 |

FOREIGN PATENT DOCUMENTS

JP    H 07-111381 B2    11/1995

* cited by examiner

*Primary Examiner* — Mirellys Jagan
(74) *Attorney, Agent, or Firm* — McDermott Will & Emery LLP

(57) ABSTRACT

It is possible to detect a failure in a temperature sensor while preventing enlarging of a circuit scale. A temperature measurement circuit 10 includes temperature sensors 20 and 30, and a comparator 40. The temperature sensor 20 includes a temperature detection unit 21 including a resistive element, a resistance value of which varies in accordance with temperature changes, and an AD converter which converts a voltage of the temperature detection unit 21 into a temperature digital value D1. The temperature sensor 30 includes a ring oscillator 31 which oscillates at a cycle that is temperature dependent, and generates a digital value D2 based on an oscillating signal output by the ring oscillator 31. The comparator 40 compares the temperature digital values D1 and D2, and outputs a signal indicating whether the temperature sensor 20 is normal or not based on a comparison result.

17 Claims, 8 Drawing Sheets

TEMPERATURE MEASUREMENT CIRCUIT AND METHOD, AND MICROCOMPUTER UNIT

CROSS-REFERENCE TO RELATED APPLICATIONS

This application is based upon and claims the benefit of priority from Japanese patent application No. 2016-235730, filed on Dec. 5, 2016, the disclosure of which is incorporated herein in its entirety by reference.

BACKGROUND

The present disclosure relates to a temperature measurement circuit and method and a microcomputer unit, and for example, a temperature measurement circuit and a microcomputer unit including a temperature sensor, and a temperature measurement method for the temperature measurement circuit and the microcomputer unit of that kind.

Japanese published examined application H07-111381 discloses a digital thermometer. The digital thermometer disclosed in Japanese published examined application H07-111381 comprises three or more temperature sensors. In the digital thermometer disclosed in Japanese published examined application H07-111381, it is determined which of a plurality of classes classified by a predetermined temperature range temperatures indicated by temperature signals output from each of three temperature sensors belong to. The digital thermometer determines a class with the highest number of temperatures belonging to it, and displays a temperature indication signal corresponding to the class determined.

SUMMARY

The digital thermometer disclosed in Japanese published examined application H07-111381 performs a majority vote for three or more temperature sensors and obtains the temperature measurement result. By doing so, an accurate temperature indication can be obtained even if an abnormality occurs in one of the three temperature sensors. However, in Japanese published examined application H07-111381, at least three temperature sensors are required, and further a logic unit for performing the majority vote is required. For this reason, the digital thermometer disclosed in Japanese published examined application H07-111381 has a problem that a circuit scale is increased.

Other problems of the related art and new features of the present disclosure will become apparent from the following descriptions of the specification and attached drawings.

According to an example aspect, a temperature measurement circuit comprises a first temperature sensor which measures a temperature using a temperature detection unit including a resistive element, a second temperature sensor which measures a temperature using a ring oscillator, and a comparator which compares the temperature measurement result of the first temperature sensor with the temperature measurement result of the second temperature sensor.

According to the above example aspect, it is possible to detect a failure in temperature sensor while preventing a circuit scale from being increased.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
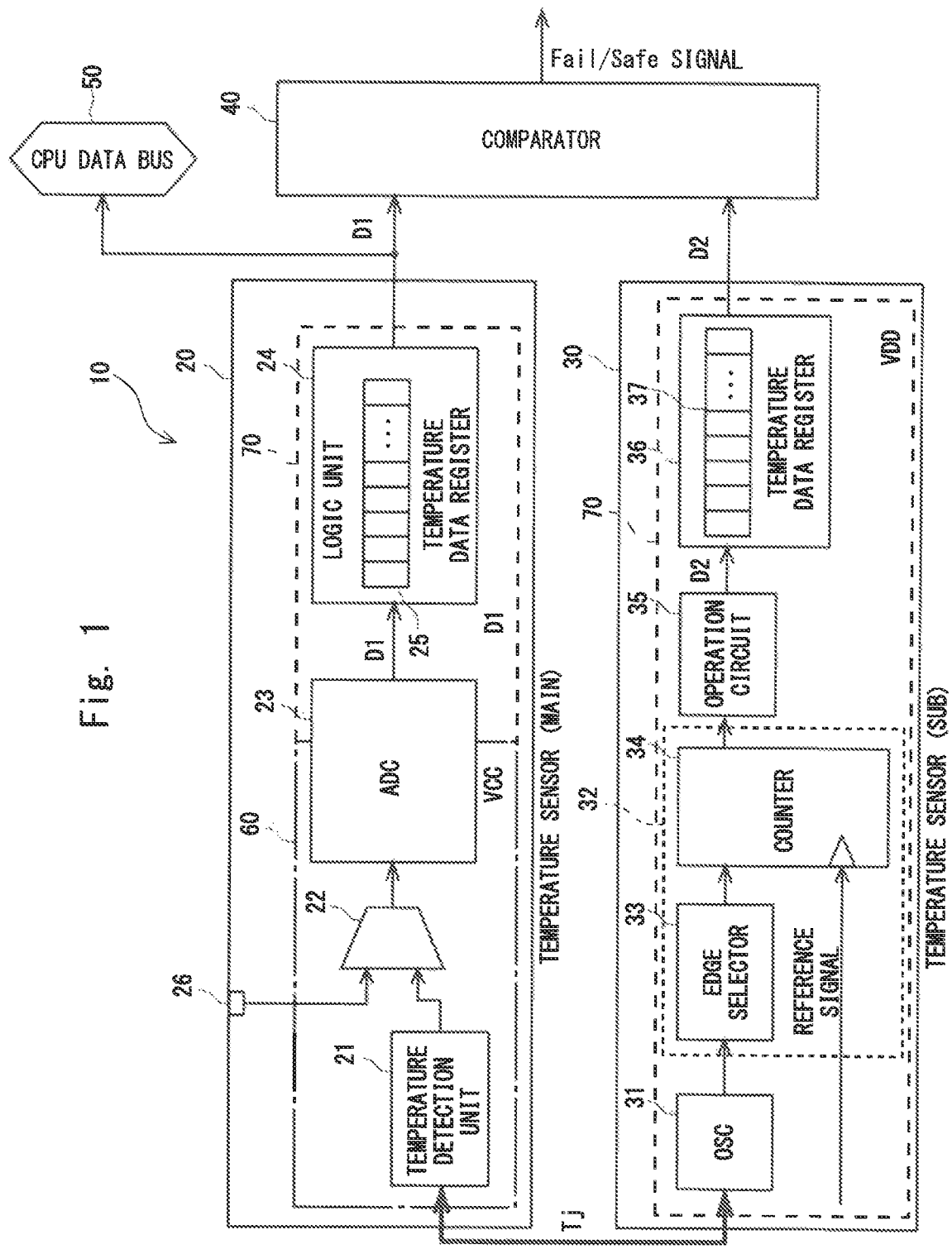
FIG. 1 is a block diagram showing a temperature measurement circuit according to a first embodiment.

Prior to explanations of embodiments being given, it is described how the inventors have arrived at the ideas of the below-shown embodiments. Broadly speaking, there are two types of temperature sensors: an analog temperature sensor and a digital temperature sensor. In this section, a temperature measurement circuit having an analog temperature sensor is considered. The analog temperature sensor comprises an analog circuit block, ADC (Analog to Digital Converter), and a logic unit. The analog circuit block comprises a temperature detection unit including resistive element such as a bipolar transistor element or a diode element. An analog voltage that is temperature dependent, output from the resistive element of the temperature detection unit, is digitally converted by the ADC. The logic unit includes a temperature data register, and into this temperature data register, a measured temperature digitally converted is store.

In the above analog temperature sensor, regarding the logic unit, it is possible to detect a failure of a circuit by implementing a BIST (built-in self test) circuit in the logic unit and causing the BIST circuit to operate. Similarly, in a user system utilizing a temperature measured by the temperature measurement circuit, it is possible to detect a failure of the logic unit by configuring a system which causes the BIST circuit to operate during a system operation.

On the other hand, regarding an analog circuit including an ADC, it is possible to detect a failure of a circuit by implementing test circuits for test modes of various kinds of IP (intellectual property) cores and for applying external (inside or outside of a chip) voltages, and evaluating a converted value corresponding to an applied voltage.

Regarding the temperature detection unit of the analog circuit block, in an environment where a junction temperature Tj is under control such as in a wafer test, it is possible to detect a failure (defect) since a target digital value can be identified. However, it is impossible to perform a test for the temperature detection unit in a normal operation, since a temperature is not identified in a normal operation state and it is difficult to identify a target digital value in an unidentified temperature environment. Accordingly, when an analog temperature sensor is used, it is difficult to detect a failure by the IP core itself in particular during an operation state.

In Japanese published examined application H07-111381, to solve the above mentioned problem, three or more temperature sensors are used, and a temperature indication signal is determined by performing a majority vote of output signals of the three temperature sensors. By doing so, it is possible to detect a failure by the IP core itself. However, the three temperature sensors have the same configuration in Japanese published examined application H07-111381. In that case, there is a problem that a system is susceptible to an influence of a common cause failure (ISO 266262). Further, since at least three temperature sensors need to be disposed, there is also a problem that a circuit scale is increased.

Hereinafter, embodiments incorporating means for solving the above-described problems will be described in detail with reference to the drawings. For the clarification of the description, the following description and the drawings may be omitted or simplified as appropriate. Further, each element shown in the drawings as functional blocks that perform various kinds of processing can be formed of a CPU (Central Processing Unit), a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference symbols and overlapping descriptions will be omitted as appropriate.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure will be described by dividing it into a plurality of sections or embodiments whenever circumstances require it for convenience in the following embodiments. However, unless otherwise particularly specified, these sections or embodiments may be not irrelevant to one another. One section or embodiment may be related to modifications, applications, details, supplementary explanations, and the like of some or all of the other ones. When reference is made to the number of elements or the like (including the number of pieces, numerical values, quantity, range, etc.) in the following embodiments, the number thereof is not limited to a specific number and may be greater than or less than or equal to the specific number unless otherwise particularly specified and definitely limited to the specific number in principle.

Further, in the following embodiments, components (including operation steps, etc.) are not always essential unless otherwise particularly specified and considered to be definitely essential in principle. Similarly, when reference is made to the shapes, positional relations, or the like of the components or the like in the following embodiments, they will include ones, for example, substantially approximate or similar in their shapes or the like unless otherwise particularly specified and considered not to be definitely so in principle. This is similarly applied even to the above-described number or the like (including the number of pieces, numerical values, quantity, range, etc.).

First Embodiment

FIG. 1 shows a temperature measurement circuit according to a first embodiment. A temperature measurement circuit 10 comprises a temperature measurement sensor 20, a temperature measurement sensor 30, and a comparator 40. The temperature measurement circuit 10 is, for example, implemented in a chip constituting a semiconductor integrated circuit. The semiconductor integrated circuit is, for example, configured as a microcomputer unit (MCU) comprising a processor (CPU) and a memory readable from the processor. The temperature sensor 20 and the temperature measurement sensor 30 respectively measure, for example, a chip temperature (a junction temperature Tj, for example) of the semiconductor integrated circuit in which the temperature measurement circuit 10 is implemented.

In the temperature measurement circuit 10, the temperature sensor 20 is used as a main temperature sensor. On the other hand, the temperature sensor 30 is used as a sub temperature sensor. The temperature sensor 20 has performance and accuracy conforming to device product specifications. It is assumed that the temperature measurement accuracy of the temperature sensor 20 is higher than that of the temperature measurement sensor 30. In other words, it is assumed that a temperature measurement error of the temperature sensor 20 is lower than that of the temperature sensor 30. A CPU implemented on the same chip with the temperature measurement circuit 10 can refer to a temperature measured by the temperature sensor 20 through a CPU data bus 50. The CPU can execute various processes based on the temperature measurement result of the temperature sensor 20.

The temperature sensor 20 comprises a temperature detection unit 21, a multiplexer 22, an AD converter (ADC) 23, and a logic unit 24. The temperature detection unit 21 is a unit which detects a temperature, for example a junction temperature Tj. The temperature detection unit 21 includes a resistive element, a resistance value of which varies in accordance with temperature changes. A bipolar transistor element or a diode element, for example, is used as the resistive element of that kind. The temperature detection unit 21 outputs a voltage that is temperature dependent as the resistance value of the resistive element varies in accordance with the temperature. The temperature detection unit 21 is configured as an analog circuit.

The multiplexer 22 selectively outputs a voltage (an analog voltage) output by the temperature detection unit 21 and an analog voltage applied to a test analog voltage inputting terminal 26 to the AD converter 23. The test analog voltage inputting terminal 26 is used for a test of the AD converter 23. The multiplexer 22 outputs the voltage output by the temperature detection unit 21 to the AD converter 23 in a normal operation state.

The AD converter 23 converts an analog voltage input via the multiplexer 22 into a digital value. The AD converter 23 converts the voltage of the resistive element included in the temperature detection unit 21 into a temperature digital value D1 in the normal operation state. As the voltage of the resistive element is temperature dependent, the temperature digital value D1 obtained by AD conversion of the voltage of the resistive element is also temperature dependent. The digital temperature value D1 indicates a temperature detected by the temperature detection unit 21.

The logic unit 24 is configured as a digital circuit including a temperature data register 25. The temperature data register 25 stores the temperature digital value D1. The temperature digital value D1 stored in the temperature data register 25 is output to the comparator 40 and the CPU data bus 50. A CPU not shown can refer to the temperature digital value D1 stored in the temperature data register 25 through the CPU data bus 50.

The temperature sensor 30 comprises a ring oscillator 31, a timer module 32, an operation circuit 35, and a logic unit 36. The ring oscillator 31 constitutes a temperature detection unit in the temperature sensor 30. For example, the same temperature (the junction temperature Tj, for example) as the temperature applied to the temperature detection section 21 of the temperature sensor 20 is applied to the ring oscillator 31. The ring oscillator 31 oscillates at a cycle that is temperature dependent. The ring oscillator 31 outputs an oscillating signal (a clock signal) that is temperature dependent.

The timer module 32 includes an edge selector 33 and a counter 34. The edge selector 33 selects a rising edge or a falling edge of the clock signal output by the ring oscillator 31. The edge selector 33 can be omitted.

The counter 34 counts a clock signal input through the edge selector 33 by using a reference signal a cycle of which is not temperature dependent. The reference signal is a high accuracy clock signal a cycle of which is not temperature dependent, and this reference signal is generated by a temperature compensated oscillator or the like. The counter 34 counts clock pulses of the clock signal in a predetermined period of time by using the reference signal. A count value of the counter 34 corresponds to a frequency (cycle) of the clock signal and it varies in accordance with temperature changes.

The operation circuit 35 converts the count value of the counter 34 into a temperature digital values D2. The temperature digital value D2 is calibrated so as to have the same value as the temperature digital value D1 with respect to the same temperature. The temperature digital value D2 indicates a temperature detected by the ring oscillator 31 constituting a temperature detection unit. The logic unit 36 includes a temperature data register 37. The temperature data register 37 stores the temperature digital value D2 output by the operation circuit 35. The temperature digital value D2 stored in the temperature data register 37 is output to the comparator 40.

Note that, in the temperature sensor 20, the temperature detection unit 21 is configured as an analog circuit and the logic unit 24 is configured as a digital circuit. In contrast, in the temperature sensor 30, each element is configured as a digital circuit. In the temperature measurement circuit 10, an analog circuit and a digital circuit are respectively operated by power supply voltages supplied from power sources different from each other. In FIG. 1, a region 60 indicates a region being operated by a voltage VCC supplied from a power source for the analog circuit. Further, a region 70 indicates a region being operated by a voltage VDD supplied from a power source for the digital circuit. The voltage VCC is 3.3V, for example, and the voltage VDD is 1.8V, for example.

In the temperature sensor 20, the temperature detection unit 21 is disposed in the region 60, and operated by the voltage VCC. On the other hand, in the temperature sensor 30, the ring oscillator 31 which is a temperature detection unit is disposed in the region 70, and operated by the voltage VDD. In a case where power sources operating the temperature detection units in the temperature sensor 20 and the temperature sensor 30 are different from each other, it is possible to reduce a common cause failure.

The comparator 40 compares the temperature digital value D1 output by the temperature sensor 20 with the temperature digital value D2 output by the temperature sensor 30. The comparator 40 outputs a signal indicating whether the temperature sensor 20 is normal or abnormal based on the comparison result. The comparator 40 calculates, for example, a difference between a temperature indicated by the temperature digital value D1 and a temperature indicated by the temperature digital value D2. When the difference falls within a range of a predetermined value, the comparator 40 regards the temperature sensor 20 as being normal and outputs a signal indicating the temperature sensor 20 is normal. When the difference deviates from the range of the predetermined value, the comparator 40 regards the temperature sensor 20 as being abnormal (not normal) and outputs a signal indicating the temperature sensor 20 is abnormal (not normal).

[Fail/Safe Signal]

Figure 2:
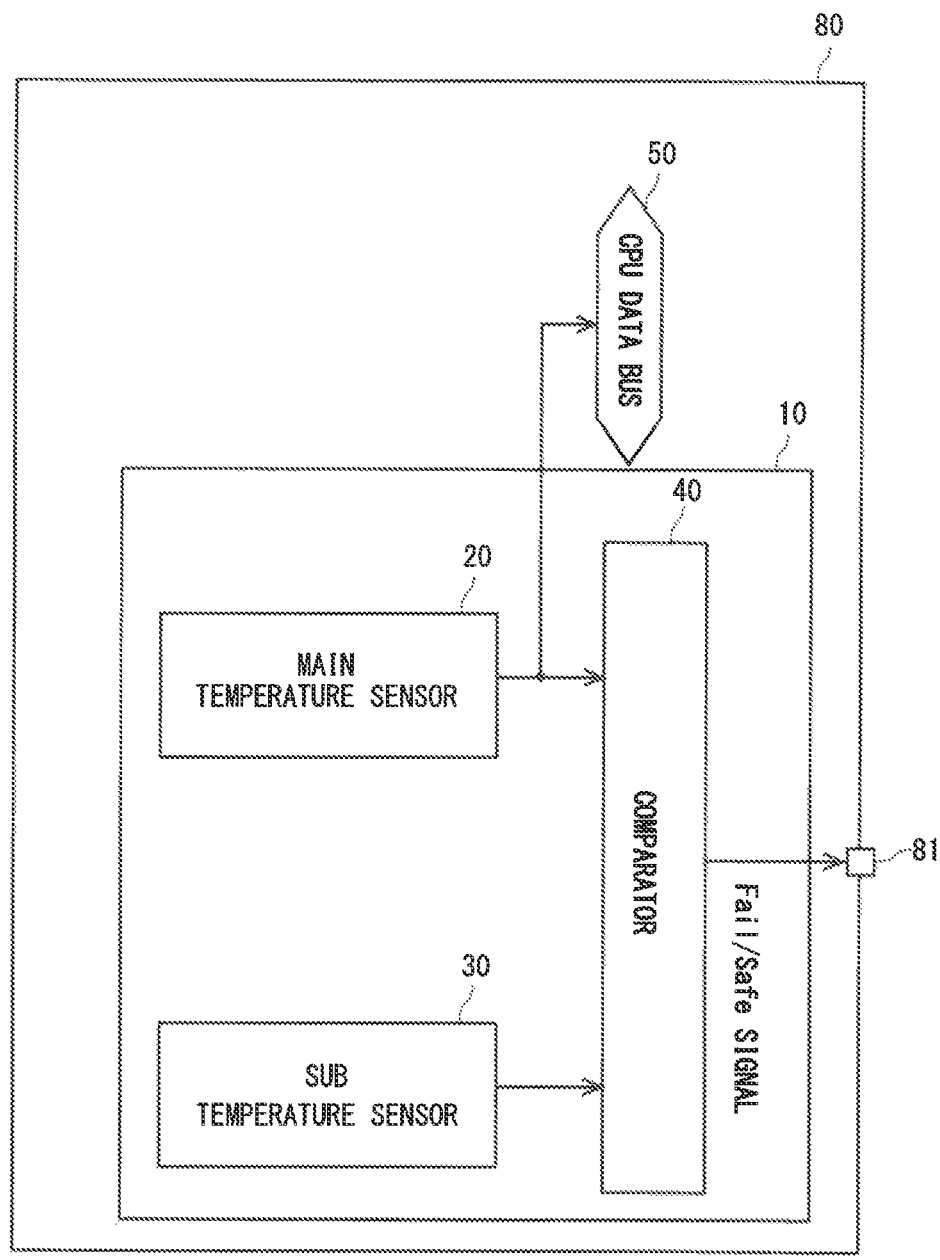
FIG. 2 is a block diagram showing a semiconductor integrated circuit including the temperature measurement circuit.

FIG. 2 shows a semiconductor integrated circuit in which the temperature measurement circuit 10 is included. A semiconductor integrated circuit 80 comprises the temperature measurement circuit 10 having a configuration shown in FIG. 1 and an external terminal 81. The comparator 40 of the temperature measurement circuit 10 outputs, based on the result of a comparison between a temperature measured by the temperature sensor 20 and a temperature measured by the temperature sensor 30, a signal (Fail/Safe signal) indicating whether or not the temperature sensor 20 is normal.

The Fail/Safe signal output by the comparator 40 is a digital signal, for example. One of a high level and a low level of this Fail/Safe signal corresponds to the temperature sensor 20 being normal and the other corresponds to the temperature sensor 20 being abnormal. The comparator 40 outputs the Fail/Safe signal to the external terminal 81 to notify a device (an external peripheral device) outside of a chip connected to the external terminal 81 whether the temperature sensor 20 is normal or abnormal. Alternatively to this or in addition to this, the comparator 40 may notify a device within a chip whether the temperature sensor 20 is normal or abnormal.

[BIST]

A BIST can be done for the logic unit 24 of the temperature sensor 20 and the temperature sensor 30, which are configured as digital circuits. Although it is omitted in FIG. 1, the logic unit 24 and temperature sensor 30 respectively comprise a BIST circuit. In the logic unit 24 and the temperature sensor 30, by operating the respective BIST circuit, operation confirmations of the logic unit 24 and temperature sensor 30 can be done.

Figure 3:
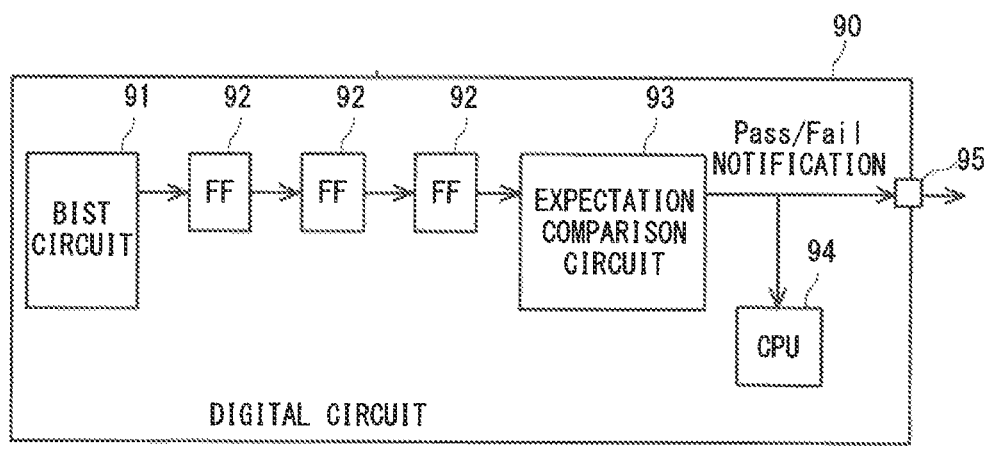
FIG. 3 is a block diagram showing a BIST circuit implemented in a digital circuit.

FIG. 3 shows a BIST circuit implemented in a digital circuit. A digital circuit 90 comprises a BIST circuit 91, a plurality of FFs (Flip Flops) 92, and an expectation comparison circuit 93. The BIST circuit 91 generates a test pattern. Each FF (scan FF) 92 constitutes a scan chain. The test pattern output by the BIST circuit 91 is input to the expectation comparison circuit 93 via the plurality of FFs 92, and in the case of FIG. 3, via three FFs 92.

The expectation comparison circuit 93 compares a signal input via the plurality of FFs 92 with an expect value corresponding to the test pattern. By comparing the signal input via the plurality of FFs 92 with the expect value in the expectation comparison circuit 93, it is confirmed whether a digital circuit in which the BIST circuit 91 is disposed is normally operating or not. The expectation comparison circuit 93 outputs the comparison result to at least one of a CPU 94 within a chip and the external terminal 95. The expectation comparison circuit 93 outputs, for example, the BIST result 'Pass' to at least one of the CPU 94 and the external terminal 95 when the input signal and the expect value are matched. When the input signal and the expect value are not matched, the expectation comparison circuit 93 outputs the BIST result 'Fail' to at least one of the CPU 94 and the external terminal 95.

With respect to the logic unit 24 of the temperature sensor 20, by implementing the above BIST circuit 91, screening of a defect failure can be done during a selection of a chip, for example. Even in a user mode which causes a certain process to be executed in a semiconductor integrated circuit, when there is a failure in the logic unit 24, it is possible to detect the failure by operating the BIST circuit 91. In the user mode, the BIST circuit 91 may be activated at least once in an operating cycle from an initiation to a completion.

Similarly, with respect to the temperature sensor 30, by operating the above BIST circuit 91, a BIST can be done, and thereby it is possible to detect a defect or a failure both at a selection and in a user mode. When the temperature measurement circuit 10 is used under a condition in which it is determined that the temperature sensor 30 operates normally via a BIST, the temperature digital value D2 is guaranteed to be a value indicating a correct temperature. When the temperature sensor 20 is not operating normally, it is possible to detect the abnormality by comparing this guaranteed temperature digital value D2 with the temperature digital value D1 output by the temperature sensor 20

It should be noted that it is possible to determine whether the AD converter 23 included in the temperature sensor 20 is operating normally or not, by inputting a specific voltage, for example at a selection, to the AD converter 23 through the test analog voltage inputting terminal 26 from an external device and then determining whether or not a digital value stored in the temperature data register 25 corresponds to the specific voltage. In a user mode, it is possible to determine whether there is a failure or not by inputting a predetermined voltage, for example by using a DAC (Digital to Analog Converter) included in a semiconductor integrated circuit, to the test analog voltage inputting terminal 26 and then determining whether or not an intended digital value is stored in the temperature data register 25.

With respect to the temperature detection unit 21, a defect can be detected during a wafer test, for example. Specifically, assuming that the temperature of a wafer stage is equal to a temperature (a junction temperature Tj) applied to the temperature detection unit 21, a defect of the temperature detection unit 21 can be detected by determining whether the temperature digital value D1 corresponding to the temperature of the wafer stage is stored in the temperature data register 25 or not. In a user mode, by using the above mentioned temperature sensor 30 capable of performing the BIST and comparing the temperature digital value D2 that is guaranteed with the temperature digital value D1, it is possible to detect a failure of the temperature detection unit 21.

[Operation Procedure]

Figure 4:
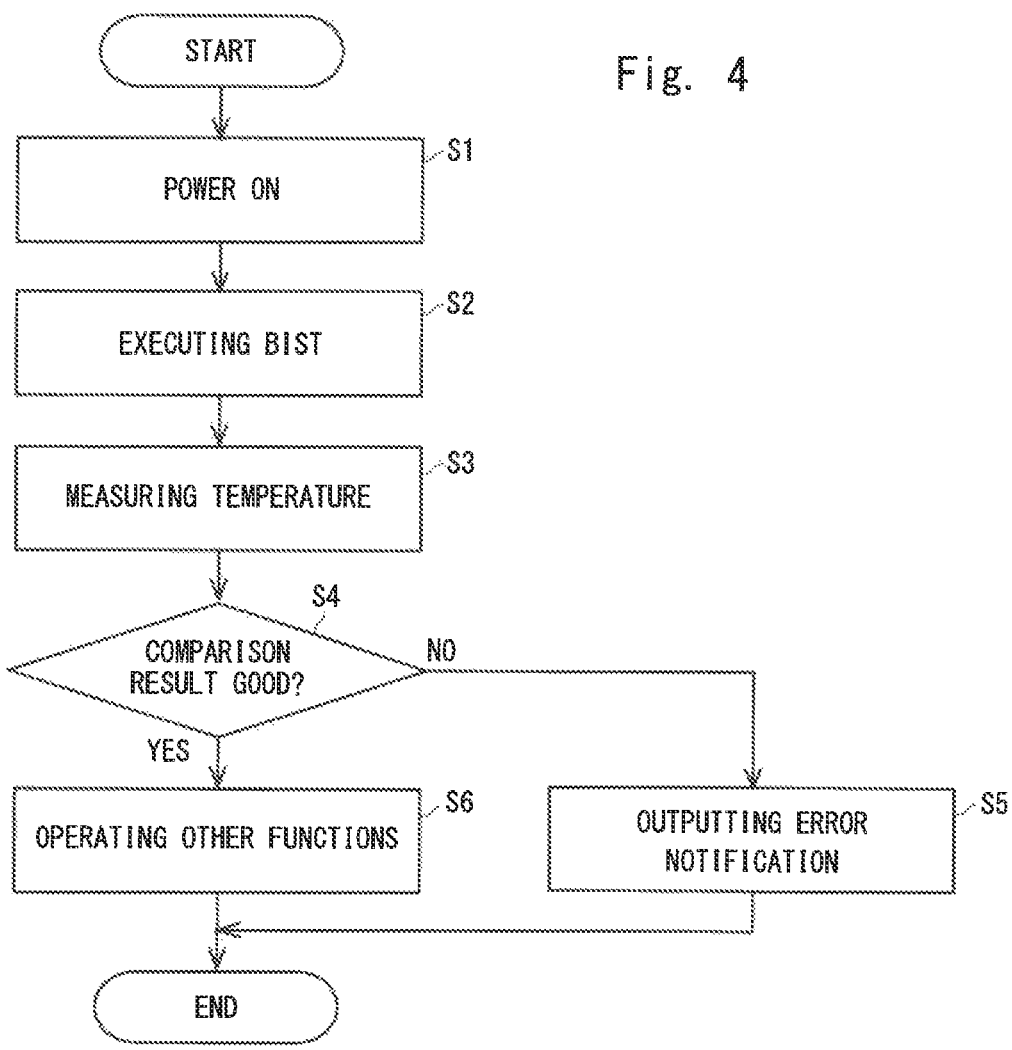
FIG. 4 is a flow chart showing an operation procedure in the temperature measurement circuit.

FIG. 4 shows an operation procedure in the temperature measurement circuit 10. When a power source of the semiconductor integrated circuit 80 (refer to FIG. 2) including the temperature measurement circuit 10 turns on (Step S1), a processor (not shown) causes the BIST circuits 91 (refer to FIG. 3) in the logic unit 24 of the temperature sensor 20 and the temperature sensor 30, respectively, to operate. The logic unit 24 and the temperature sensor 30 respectively execute the BIST (Step S2).

After execution of the BIST, the temperature sensor 20 and the temperature sensor 30 respectively perform temperature measurements if there is no failures in the logic unit 24 and the temperature sensor 30 (Step S3). In Step S3, as the temperature sensor 20 performs a temperature measurement, the temperature digital value D1 is obtained. In addition, as the temperature sensor 30 performs a temperature measurement, the temperature digital value D2 is obtained.

The comparator 40 compares the temperature measurement results obtained by two temperature sensors. Namely, the comparator 40 compares the temperature digital value D1 with the temperature digital value D2. The comparator 40 determines whether the comparison result is good or bad, namely, whether the digital values are matched or not (Step S4). The comparator 40 determines that the digital values are matched if a temperature indicated by the temperature digital value D1 and a temperature indicated by the temperature digital value D2 are about the same temperature. When it is determined that the digital value are not matched in Step S4, the comparator 40 outputs a signal indicating that the temperature sensor 20 is abnormal to notify about an error (Step S5). When it is determined that the digital values are matched in Step S4, the processor executes other processes (Step S6).

Operation Example

Figure 5:
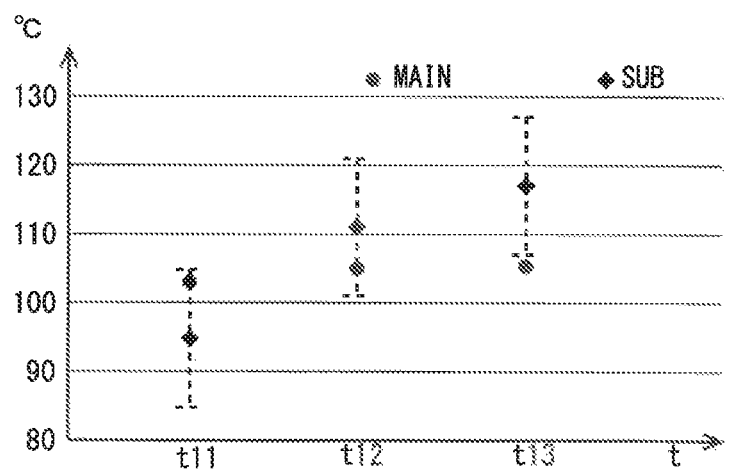
FIG. 5 is a graph showing an example of temperatures measured by two temperature sensors.

FIG. 5 shows temperatures measured by the temperature sensor 20 and temperatures measured by the temperature sensor 30. In FIG. 5, the temperature measurement results (Main) of the temperature sensor 20 are plotted by circles, and the temperature measurement results (Sub) of the temperature sensor 30 are plotted by rhombuses. In FIG. 5, error ranges of the temperature sensor 30 are indicated by dotted lines. In FIG. 5, assuming that the temperature accuracy of the temperature sensor 30 is −10 degrees centigrade to +10 degrees centigrade, ranges of −10 degrees centigrade to +10 degrees centigrade with reference to temperatures measured by the temperature sensor 30 are indicated as the error ranges.

The comparator 40 outputs a signal indicating that the temperature sensor 20 is normal, for example, if a difference between a temperature indicated by the temperature digital value D1 and a temperature indicated by the temperature digital value D2 falls within the range of the temperature accuracy of the temperature sensor 30. In other words, the comparator 40 outputs a signal indicating that the temperature sensor 20 is normal if a temperature indicated by the temperature digital value D1 falls within a range of the temperature error of the temperature sensor 30 with reference to a temperature indicated by the temperature digital value D2.

For example, it is assumed that Step S3 of FIG. 4 is executed at certain time t11 shown in FIG. 5, the temperature digital value D1 output by the temperature sensor 20 indicates 103 degrees centigrade, and the temperature digital value D2 output by the temperature sensor 30 indicates 95 degrees centigrade. In this case, since '103 degrees centigrade' that is the temperature measurement result of the temperature sensor 20 falls within a range of −10 degrees centigrade to +10 degrees centigrade with reference to '95 degrees centigrade' that is the temperature measurement result of the temperature sensor 30, the comparator 40 outputs a signal indicating that the temperature sensor 20 is normal.

Next, it is assumed that Step S3 is executed at time t12, the temperature digital value D1 output by the temperature sensor 20 indicates 105 degrees centigrade, and the temperature digital value D2 output by the temperature sensor 30 indicates 111 degrees centigrade. In this case, similarly to the above case, since '105 degrees centigrade' that is the temperature measurement result of the temperature sensor 20 falls within a range of −10 degrees centigrade to +10 degrees centigrade with reference to '111 degrees centigrade' that is the temperature measurement result of the temperature sensor 30, the comparator 40 outputs a signal indicating that the temperature sensor 20 is normal.

Further, it is assumed that Step S3 is executed at time t13, the temperature digital value D1 output by the temperature sensor 20 indicates 105 degrees centigrade, and the temperature digital value D2 output by the temperature sensor 30 indicates 117 degrees centigrade. In this case, '105 degrees centigrade' that is the temperature measurement result of the temperature sensor 20, deviates from a range of −10 degrees centigrade to +10 degrees centigrade with reference to '117 degrees centigrade' that is the temperature measurement result of the temperature sensor 30. It is confirmed that the temperature sensor 30 operates normally by the BIST executed in Step S2, and thus it is guaranteed that the temperature measurement result of the temperature sensor 30 is correct. Therefore, when the temperature digital value D1 and the temperature digital value D2 indicate different temperatures, it can be determined that a correct temperature measurement result is not obtained in the temperature sensor 20. In such a case, the comparator 40 outputs a signal indicating that the temperature sensor 20 is abnormal.

[Summary]

In the present embodiment, the temperature measurement circuit 10 comprises the temperature sensor 20 and the temperature sensor 30. The temperature sensor 20 is a temperature sensor using a resistive element, a resistance value of which varies in accordance with temperature changes. In contrast, the temperature sensor 30 is a temperature sensor using a ring oscillator oscillating at a cycle that is temperature dependent. In the present embodiment, the temperature measurement circuit 10 comprises two different types of temperature sensors, and compares temperature measurement results obtained by the two temperature sensors. In the present embodiment, the temperature sensors are configured as a heterogeneous multiplexing system, and thus it is less likely that a common cause failure will occur than in a system in which a plurality of temperature sensors of the same configuration are used.

In the present embodiment, specifically, an analog circuit is used for temperature detection in the temperature sensor 20, and a digital circuit is used for temperature detection in the temperature sensor 30. By operating the temperature detection unit 21 by an analog power supply in the temperature sensor 20 and operating the ring oscillator 31 which constitutes a temperature detection unit by a digital power supply in the temperature sensor 30, it is possible to mitigate failures caused by common cause. Since it is possible to mitigate failures caused by common cause, time consuming implementations of layout measures can be omitted in the present embodiment.

Further, in the present embodiment, the temperature sensor 30 is configured as a digital circuit and thus a BIST can be executed in the temperature sensor 30. It is possible to confirm that the temperature sensor 30 operates normally in a user mode by the BIST, and, accordingly, it is possible to guarantee that a temperature measured by the temperature sensor 30 is correct. In the present embodiment, it is possible to determine whether the temperature measurement result of the temperature sensor 20 is correct or not by comparing the temperature measurement result of the temperature sensor 20 with the temperature measurement result of the temperature sensor 30 which is guaranteed to be correct In particular, if the temperature measurement sensor 20 and the temperature measurement sensor 30 are implemented on the same chip, it is possible to guarantee a temperature measurement value in a semiconductor device of a single chip. If a temperature measurement value of the temperature sensor 20 is not guaranteed to be correct, it is conceivable that an external temperature sensor can be separately disposed outside of a semiconductor device in preparation for cases where the temperature sensor 20 fails to operate properly. However, in that case, the number of components in a system is increased. In the present embodiment, since a temperature measurement value of the temperature sensor 20 is guaranteed in a single chip, an advantageous effect that the number of components can be reduced compared to the case where an external temperature sensor is separately disposed can also be obtained.

Furthermore, in the present embodiment, the temperature sensor 30 used as a sub temperature sensor is configured as a digital circuit including a ring oscillator, and thus an AD converter is not required to be implemented thereon. In addition, circuit designing of an analog power supply is not required in the temperature sensor 30. For these reasons, the temperature sensor 30 can be implemented in an implementation area, as an example, about ¼ the size of area which the temperature sensor 20 used as a main temperature sensor is implemented, and an area reducing effect can be obtained.

In comparison with Japanese published examined application H07-111381, while three or more temperature sensors are required in Japanese published examined application H07-111381, just two temperature sensors may be used in the present embodiment. Further, while a logic unit for performing a majority vote is required in Japanese published examined application H07-111381, the temperature measurement results of two temperature sensors may be compared in the present embodiment, and thus a logic unit for performing a majority vote is not required. Therefore, it is possible to reduce a circuit scale in the present embodiment compared to that of Japanese published examined application H07-111381.

Second Embodiment

Figure 6:
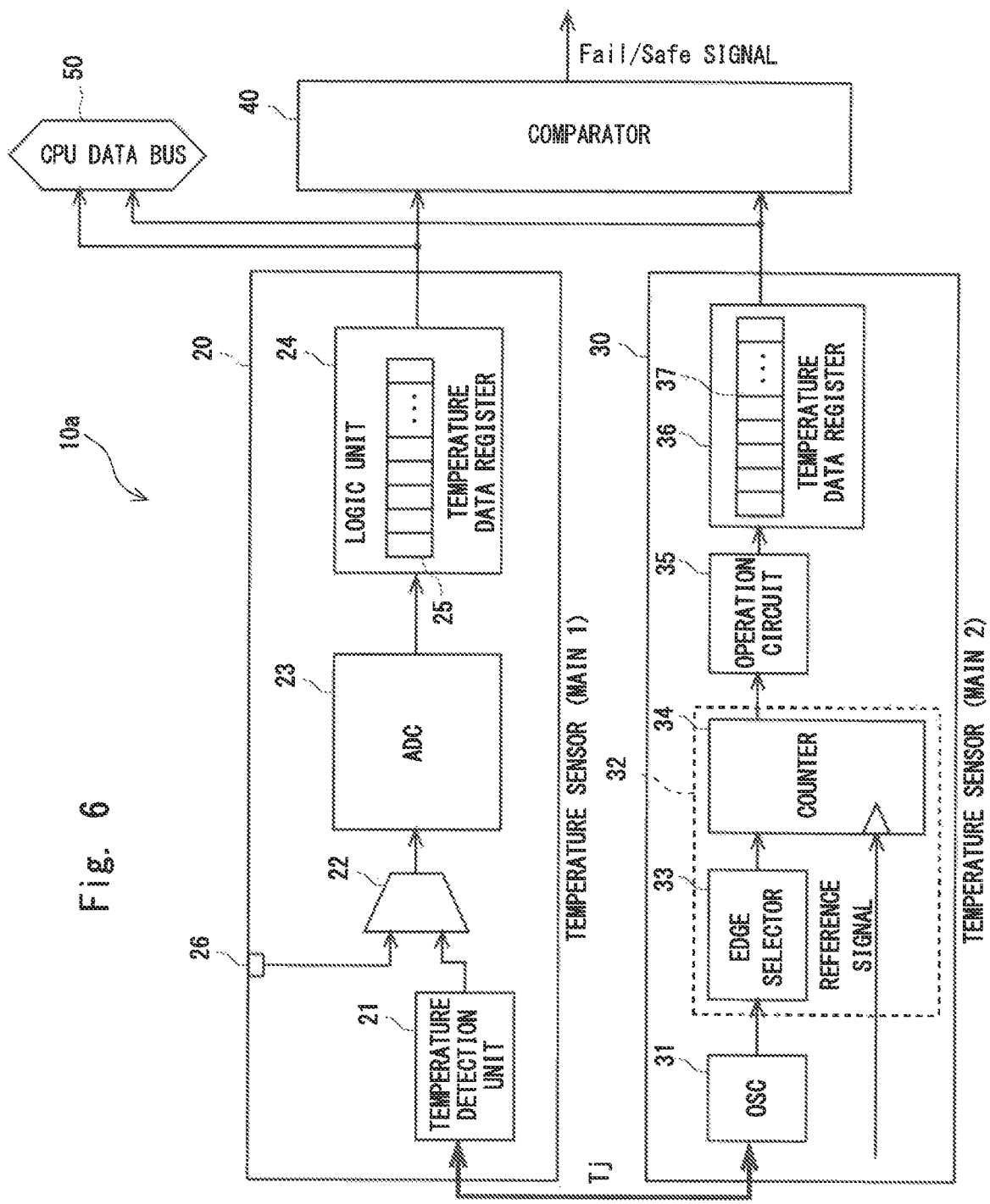
FIG. 6 is a block diagram showing a temperature measurement circuit according to a second embodiment.

FIG. 6 shows a temperature measurement circuit according to a second embodiment. A difference between the temperature measurement circuit 10 according to the first embodiment shown in FIG. 1 and a temperature measurement circuit 10a according to the present embodiment is that the temperature data register 37 of the temperature sensor 30 further outputs the temperature digital value D2 to the CPU data bus 50. In the present embodiment, a CPU of a semiconductor integrated circuit in which the temperature measurement circuit 10a is implemented can refer to the temperature digital value D2 through the CPU data bus 50 in addition to the temperature digital value D1.

In the first embodiment, the CPU obtains, for example, the temperature digital value D1 from the temperature data register 25 of the temperature sensor 20, and executes a process according to the obtained temperature. In the present embodiment, the CPU can obtains the temperature digital value D2 from the temperature data register 37 of the temperature sensor 30, and can execute a process according to the obtained temperature. In this way, in the present embodiment, the temperature digital value D2 can be utilized for a process in the CPU, not only for determining normality or abnormality of the temperature sensor 20.

The CPU, for example, checks whether a temperature indicated by the temperature digital value D1 and a temperature indicated by the temperature digital value D2 deviate from respective predetermined temperature ranges or not. More specifically, the CPU respectively determines whether or not a temperature indicated by the temperature digital value D1 and a temperature indicated by the temperature digital value D2 are equal to or lower than a temperature threshold value corresponding to a lower limit of the predetermined temperature range, or equal to or greater than a temperature threshold value corresponding to an upper limit of the predetermined temperature range.

The CPU executes a predetermined process if at least one of a temperature indicated by the temperature digital value D1 and a temperature indicated by the temperature digital value D2 deviate from the predetermined temperature range. That is, the CPU executes a predetermined process when at least one of a temperature indicated by the temperature digital value D1 and a temperature indicated by the temperature digital value D2 are equal to or lower than a temperature threshold value corresponding to a lower limit of the predetermined temperature range, or equal to or greater than a temperature threshold value corresponding to an upper limit of the predetermined temperature range. In this way, by utilizing the two temperature measurement results of the temperature sensor 20 and the temperature sensor 30, a more robust system can be constructed compared to a case where only the measurement result of the temperature sensor 20 is utilized.

Operation Example

Figure 7:
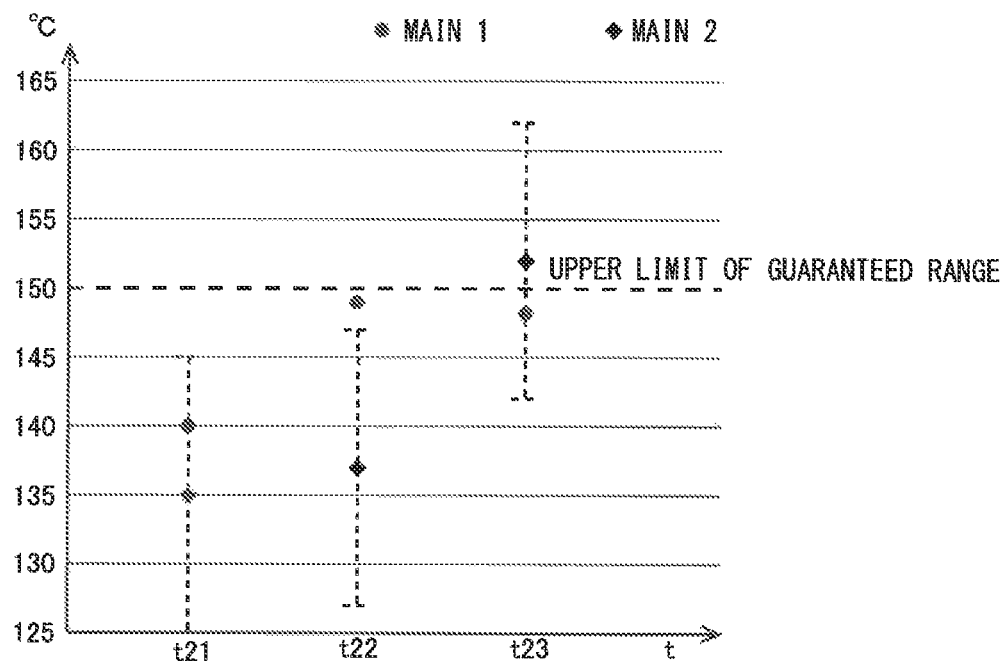
FIG. 7 is a graph showing an example of temperatures measured by two temperature sensors in the second embodiment.

FIG. 7 shows temperatures measured by the temperature sensor 20 and temperatures measured by the temperature sensor 30. In FIG. 7, the temperature measurement results (Main 1) of the temperature sensor 20 are plotted by circles, and the temperature measurement results (Main 2) of the temperature sensor 30 are plotted by rhombuses. In FIG. 7, error ranges of the temperature sensor 30 are indicated by dotted lines. In FIG. 7, assuming that the temperature accuracy of the temperature sensor 30 is −10 degrees centigrade to +10 degrees centigrade, ranges of −10 degrees centigrade to +10 degrees centigrade with reference to temperatures measured by the temperature sensor 30 are also indicated as the error ranges. In FIG. 7, an upper limit of an operation guaranteed temperature range of a semiconductor integrated circuit in which the temperature measurement circuit 10 is implemented is indicated.

For example, it is assumed that Step S3 of FIG. 4 is executed at certain time t21 shown in FIG. 7, the temperature digital value D1 output by the temperature sensor 20 indicates 140 degrees centigrade, and the temperature digital value D2 output by the temperature sensor 30 indicates 135 degrees centigrade. In this case, since '140 degrees centigrade' that is the temperature measurement result of the temperature sensor 20 falls within a range −10 degrees centigrade to +10 degrees centigrade with reference to '135 degrees centigrade' that is the temperature measurement result of the temperature sensor 30, a signal indicating that the temperature sensor 20 is normal is output. Further, since both '140 degrees centigrade' that is the temperature measurement result of the temperature sensor 20 and '135 degrees centigrade' that is the temperature measurement result of the temperature sensor 30 are lower than '150 degrees centigrade' that is the upper limit of the operation guaranteed temperature range, the CPU continues a normal operation.

Next, it is assumed that Step S3 is executed at time t22, the temperature digital value D1 output by the temperature sensor 20 indicates 149 degrees centigrade, and the temperature digital value D2 output by the temperature sensor 30 indicates 137 degrees centigrade. In this case, while both temperature measurement results are lower than the upper limit of the operation guaranteed temperature range, '149 degrees centigrade' that is the temperature measurement result of the temperature sensor 20 deviates from a range −10 degrees centigrade to +10 degrees centigrade with reference to '137 degrees centigrade' that is the temperature measurement result of the temperature sensor 30. In this case, as the temperature sensor 20 is abnormal, a signal indicating that the temperature sensor 20 is abnormal is output from the comparator 40, and the CPU executes a predetermined process, for example a safety process.

Further, it is assumed that Step S3 is executed at time t23, the temperature digital value D1 output by the temperature sensor 20 indicates 148 degrees centigrade, and the temperature digital value D2 output by the temperature sensor 30 indicates 152 degrees centigrade. In this case, since '148 degrees centigrade' that is the temperature measurement result of the temperature sensor 20 falls within a range −10 degrees centigrade to +10 degrees centigrade with reference to '152 degrees centigrade' that is the temperature measurement result of the temperature sensor 30, a signal indicating that the temperature sensor 20 is normal is output. However, the CPU determines that '152 degrees centigrade' that is the temperature measurement result of the temperature sensor 30 is higher than the upper limit of the operation guaranteed temperature range, and executes the predetermined process, for example the safety process. Supposing that the CPU only referred to the temperature measurement result of the temperature sensor 20, since the temperature measurement result '149 degrees centigrade' is lower than the operation guaranteed temperature range '150 degrees centigrade', the safety process would not be executed. In the present embodiment, by configuring a system such that the CPU obtains the temperature measurement results of two temperature sensors and executes the safety process when at least one of the temperature measurement results exceed the upper limit of the operation guaranteed temperature range, it is possible to construct a more robust system.

Figure 8:
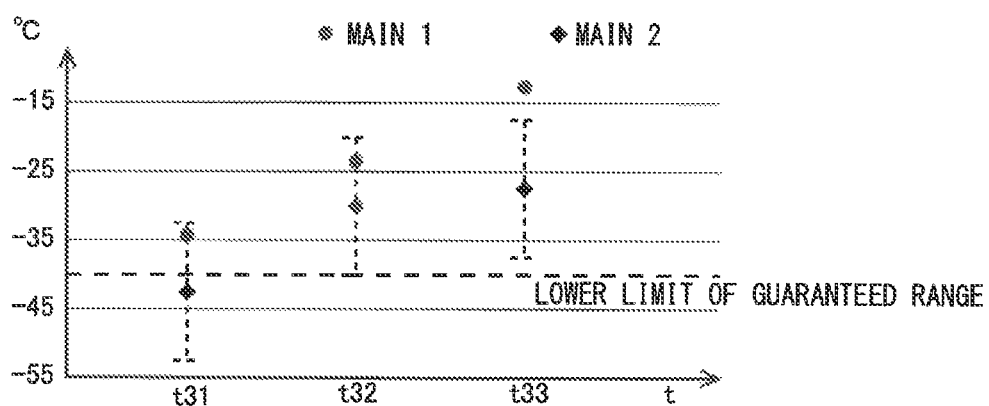
FIG. 8 is a graph showing another example of temperatures measured by two temperature sensors in the second embodiment.

FIG. 8 shows another example of temperatures measured by the temperature sensor 20 and temperatures measured by the temperature sensor 30. Similar to the case of FIG. 7, in FIG. 8, the temperature measurement results (Main 1) of the temperature sensor 20 are plotted by circles, and the temperature measurement results (Main 2) of the temperature sensor 30 are plotted by rhombuses. In FIG. 8, error ranges of the temperature sensor 30 are indicated by dotted lines. In FIG. 8, assuming that the temperature accuracy of the temperature sensor 30 is −10 degrees centigrade to +10 degrees centigrade, ranges of −10 degrees centigrade to +10 degrees centigrade with reference to temperatures measured by the temperature sensor 30 are indicated as the error ranges. In FIG. 8, a lower limit of an operation guaranteed temperature range of a semiconductor integrated circuit in which the temperature measurement circuit 10 is implemented is indicated.

For example, it is assumed that Step S3 of FIG. 4 is executed at certain time t31 shown in FIG. 8, the temperature digital value D1 output by the temperature sensor 20 indicates −34 degrees centigrade, and the temperature digital value D2 output by the temperature sensor 30 indicates −42 degrees centigrade. In this case, since '−34 degrees centigrade' that is the temperature measurement result of the temperature sensor 20 falls within a range −10 degrees centigrade to +10 degrees centigrade with reference to '−42 degrees centigrade' that is the temperature measurement result of the temperature sensor 30, a signal indicating that the temperature sensor 20 is normal is output. However, the CPU determines that '−42 degrees centigrade' that is the temperature measurement result of the temperature sensor 30 is lower than the lower limit of the operation guaranteed temperature range, and executes a predetermined process, for example, a safety process. Supposing that the CPU only referred to the temperature measurement result of the temperature sensor 20, since the temperature measurement result '−34 degrees centigrade' is higher than the operation guaranteed temperature range '−40 degrees centigrade', the safety process would not be executed. In the present embodiment, by configuring a system such that the CPU obtains the temperature measurement results of two temperature sensors and executes the safety process when at least one of temperature measurement results is lower than the lower limit of the operation guaranteed temperature range, it is possible to construct a more robust system.

Next, it is assumed that Step S3 is executed at time t32, the temperature digital value D1 output by the temperature sensor 20 indicates −24 degrees centigrade, and the temperature digital value D2 output by the temperature sensor 30 indicates −30 degrees centigrade. In this case, since '−24 degrees centigrade' that is the temperature measurement result of the temperature sensor 20 falls within a range −10 degrees centigrade to +10 degrees centigrade with reference to '−30 degrees centigrade' that is the temperature measurement result of the temperature sensor 30, a signal indicating that the temperature sensor 20 is normal is output. Further, since both '−24 degrees centigrade' that is the temperature measurement result of the temperature sensor 20 and '−30 degrees centigrade' that is the temperature measurement result of the temperature sensor 30 are higher than '−40 degrees centigrade' that is the lower limit of the operation guaranteed temperature range, the CPU continues a normal operation.

Further, it is assumed that Step S3 is executed at time t33, the temperature digital value D1 output by the temperature sensor 20 indicates −14 degrees centigrade, and the temperature digital value D2 output by the temperature sensor 30 indicates −27 degrees centigrade. In this case, while both temperature measurement results are higher than the lower limit of the operation guaranteed temperature range, '−14 degrees centigrade' that is the temperature measurement result of the temperature sensor 20 deviates from a range −10 degrees centigrade to +10 degrees centigrade with reference to '−27 degrees centigrade' that is the temperature measurement result of the temperature sensor 30. In this case, as the temperature sensor 20 is abnormal, a signal indicating that the temperature sensor 20 is abnormal is output from the comparator 40, and the CPU executes a predetermined process, for example a safety process.

[Summary]

In the present embodiment, the temperature data register 25 of the temperature sensor 20 and the temperature data register 37 of the temperature sensor 30 are connected to the CPU data bus 50, and the CPU can refer to the temperature measurement results of both the temperature sensor 20 and the temperature sensor 30. By doing so, the CPU can determine whether or not temperatures measured by the two temperature sensors fall within a predetermined range, respectively. In the present embodiment, it is possible for the CPU to execute a predetermined process when at least one of the temperature measurement result of the temperature sensor 20 and the temperature measurement result of the temperature sensor 30 deviate from the predetermined range. Therefore, a higher accuracy temperature control can be realized compared to a case where only the measurement result of the temperature sensor 20 is referred.

Third Embodiment

Figure 9:
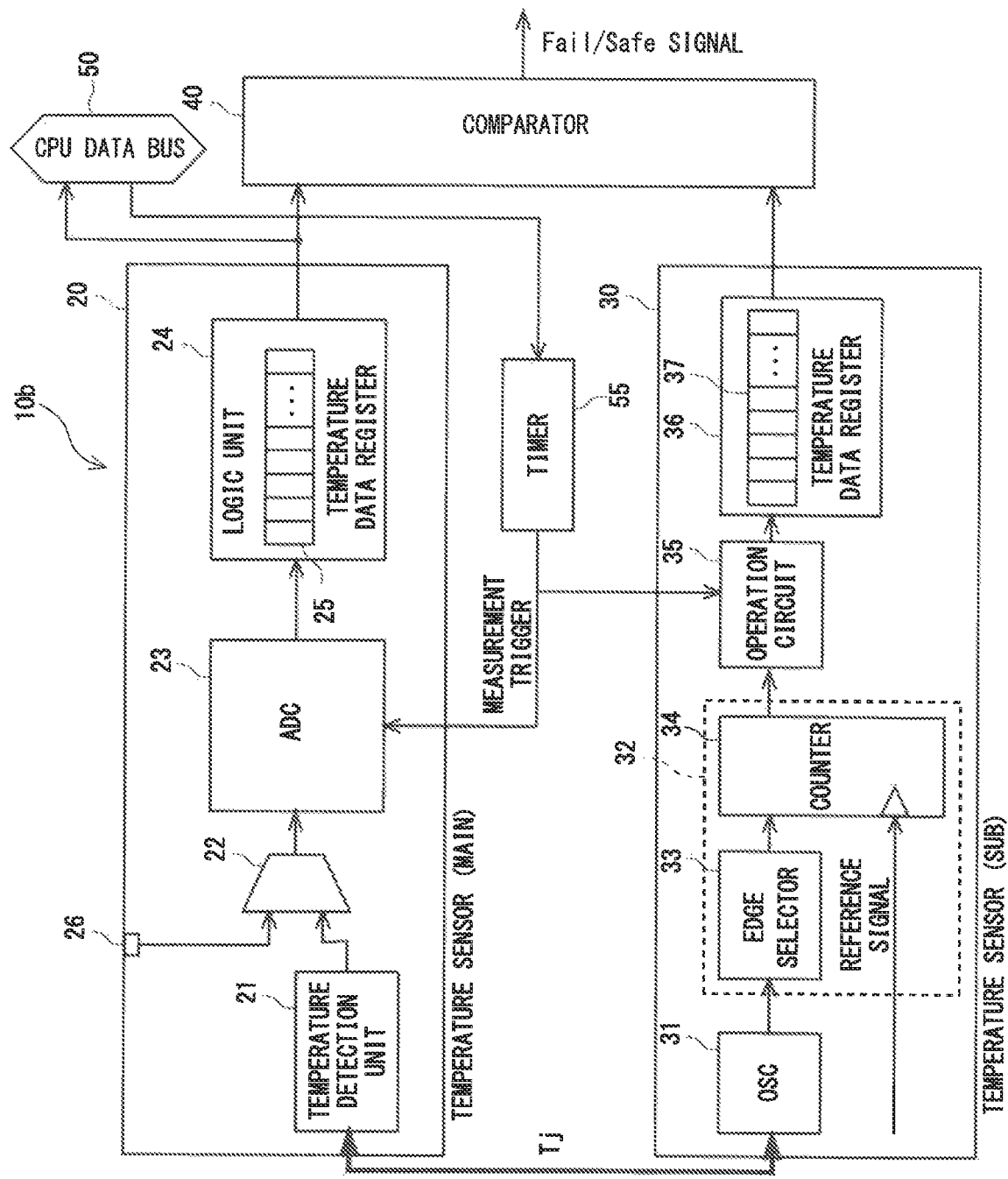
FIG. 9 is a block diagram showing a temperature measurement circuit according to a third embodiment.

FIG. 9 shows a temperature measurement circuit according to a third embodiment. A temperature measurement circuit 10b according to the present embodiment comprises a timer 55 in addition to the configuration of the temperature measurement circuit 10 according to the first embodiment shown in FIG. 1. Note that the present embodiment may be combined with the second embodiment. That is, it is possible to adopt a configuration in which the temperature measurement circuit 10b according to the present embodiment comprises a timer 55 in addition to the configuration of the temperature measurement circuit 10a according to the second embodiment shown in FIG. 6.

The timer 55 outputs a measurement trigger to the AD converter 23 of the temperature sensor 20 and the operation unit 35 of the temperature sensor 30. The temperature sensor 20 and the temperature sensor 30 perform the temperature measurement in response to the measurement trigger output by the timer 55, and they respectively store the results of the temperature measurement into the temperature measurement data register 25 and temperature data register 37.

In the present embodiment, a CPU of a semiconductor integrated circuit in which the temperature measurement circuit 10b is implemented notifies about a temperature continuous measurement mode to the timer 55 via the CPU data bus 50. When the timer 55 receives a notification of the temperature continuous measurement mode, the timer 55 periodically outputs the measurement trigger to the AD converter 23 and the operation circuit 35. As the timer 55 periodically outputs the measurement trigger, the temperature sensor 20 and the temperature sensor 30 periodically perform the temperature measurement. The comparator 40 compares the periodically obtained temperature digital value D1 with the periodically obtained temperature digital value D2, and periodically outputs the Fail/Safe signal based on the comparison result.

The temperature measurement circuit 10b according to the present embodiment comprises the timer 55. In the present embodiment, by periodically outputting the measurement trigger, for example, outputting the measurement trigger at regular time intervals from the timer 55, it is possible to inspect whether there is a failure in the temperature sensor 20 or not at regular time intervals without an intervention of software executed on the CPU.

[Microcomputer Unit]

Figure 10:
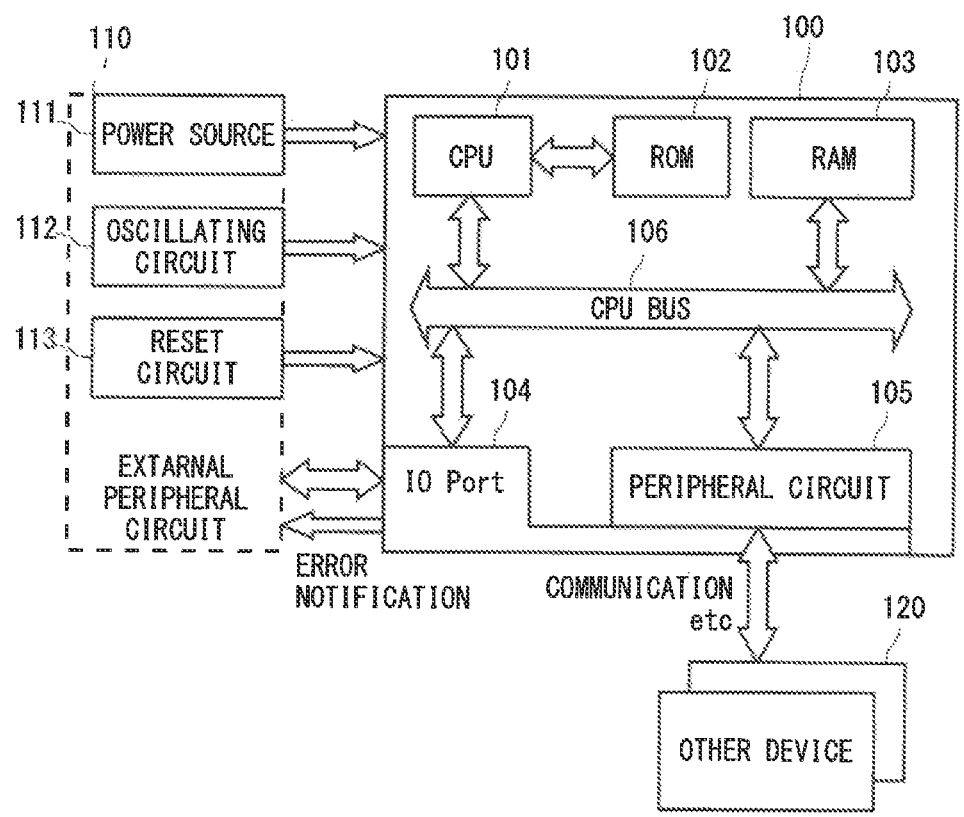
FIG. 10 is a block diagram showing a microcomputer unit.

Note that the temperature measurement circuit according to each of the above-described embodiments can be implemented in a microcomputer unit. FIG. 10 shows a microcomputer unit. A microcomputer unit 100 comprises a CPU 101, a ROM 102, a RAM 103, an input/output (I/O) port 104, a peripheral circuit 105, and a CPU bus 106. The microcomputer unit 100 is configured as a vehicle-mounting microcomputer unit implemented in a vehicle such as an automobile, for example. The microcomputer unit 100 is used, for example, for an ADAS (Advanced Driver Assistance System) in a vehicle.

The CPU 101 is a processor, and executes various kinds of processes in the microcomputer unit. The CPU 101 is connected to the RAM 103, the I/O port 104, the peripheral circuit 105 and the like via the CPU bus 106. In the CPU bus 106, the CPU data bus 50 shown in FIG. 1, etc. is included. The ROM 102 is a non-volatile memory such as a flash memory or the like, and stores a program to be executed by the CPU 101, and the like. The CPU 101 executes a program read out from the ROM 102 to perform various kinds of processes. The RAM 103 is a volatile memory for storing various kinds of data.

The I/O port 104 inputs and outputs signals between the microcomputer unit 100 and an external peripheral circuit 110 and other devices 120. In the I/O port 104, the test analog voltage input terminal 26 shown in FIG. 1, the external terminal 81 shown in FIG. 2, the external output terminal 95 shown in FIG. 3 and the like are included. The peripheral circuit 105 includes various kinds of peripheral circuits built in the microcomputer unit 100. In the peripheral circuit 105, for example, the temperature sensor 20, the temperature sensor 30, and the comparator 40 shown in FIG. 1 and the like are included. The peripheral circuit 105 can communicate with the other devices 120 thorough the I/O port 104.

The external peripheral circuit 110 includes a power source 111, an oscillating circuit 112, a reset circuit 113 and the like. The power source 111 supplies power to the microcomputer unit 100. The power source 111 may include a power source for analog circuits for supplying power to the region 60 shown in FIG. 1 and a power source for digital circuits for supplying power to the region 70. The oscillator 112 supplies a clock signal or the like to the microcomputer unit 100. The reset circuit 113 resets the microcomputer unit 100. The reset circuit 113 resets the microcomputer unit 100, for example, when the Fail/Safe signal indicating that the temperature sensor 20 is abnormal is output from the external terminal 81 (refer to FIG. 2).

By configuring a system in which the temperature measurement result of the temperature sensor 20 and the temperature measurement result of the temperature sensor 30 are compared at regular time intervals in the temperature measurement circuit 10 which is implemented in the microcomputer unit 100 as a portion thereof, it is possible to make the microcomputer unit 100 comply with ISO 26262 by itself. Further, in the temperature measurement circuit 10, since a temperature detection unit of the temperature sensor 30 is configured as a digital circuit using the ring oscillator 31, and a BIST of the temperature detection unit can be executed, the microcomputer unit 100 is also effective as countermeasure against Latent of ISO 262626.

Modified Example

It should be noted that an example is explained with reference to FIG. 4, in which Step S2 is performed at an initiation (at powering on) of the semiconductor integrated circuit and a BIST is executed in the temperature sensor 30. However, the present disclosure is not limited thereto. The BIST of the temperature sensor 30 may be executed at least once in an operating cycle from an initiation of a process to a completion of the process in the semiconductor integrated circuit, and execution timing of the BIST is not limited to specific timing. For example, instead of executing the BIST at powering on, the BIST of the temperature sensor 30 may be executed in a process of a shutdown of the semiconductor integrated circuit at powering off.

In the above-described embodiments, an example is explained, in which the comparator 40 outputs a signal indicating whether the temperature sensor 20 is normal or not based on a difference between the temperature measurement result of the temperature sensor 20 and the temperature measurement result of the temperature sensor 30. However, the present disclosure is not limited thereto. For example, the comparator 40 may calculate a correlation between the temperature measurement result of the temperature sensor 20 and the temperature measurement result of the temperature sensor 30, and output a signal indicating whether the temperature sensor 20 is normal or not based on whether there is a correlation.

In each of above-described embodiments, an example in which the temperature measurement circuit in implemented in a microcomputer unit is explained. However, the present disclosure is not limited thereto. The temperature measurement circuit may be configured as another integrated circuit (IC) having a temperature measurement function.

While the invention has been described in terms of several embodiments, those skilled in the art will recognize that the invention can be practiced with various modifications within the spirit and scope of the appended claims and the invention is not limited to the examples described above.

Two or more of the above described embodiments can be combined as desirable by one of ordinary skill in the art.

Further, the scope of the claims is not limited by the embodiments described above.

Furthermore, it is noted that Applicant's intent is to encompass equivalents of all claim elements, even if amended later during prosecution.

What is claimed is:

1. A temperature measurement circuit comprising:
    a first temperature sensor comprising a temperature detection unit including a resistive element, a resistance value of which varies in accordance with temperature changes, and an analog to digital converter which converts a voltage value of the resistive element into a first temperature digital value;
    a second temperature sensor comprising a ring oscillator which oscillates at a cycle that is temperature dependent, the second temperature sensor configured to generate a second temperature digital value based on an oscillating signal output by the ring oscillator; and
    a comparator configured to compare the first temperature digital value with the second temperature digital value, and configured to output a signal indicating whether the first temperature sensor is normal or abnormal based on a comparison result.

2. The temperature measurement circuit according to claim 1, wherein the temperature detection unit of the first temperature sensor operates under a first power supply voltage and the second temperature sensor operates under a second power supply voltage supplied from a power source different from a power source which supplies the first power supply voltage.

3. The temperature measurement circuit according to claim 1, wherein when a difference between a first temperature indicated by the first temperature digital value and a second temperature indicated by the second temperature digital value falls within a range of a predetermined value, the comparator outputs a signal indicating that the first temperature sensor is normal.

4. The temperature measurement circuit according to claim 1, wherein when a first temperature indicated by the first temperature digital value falls within a temperature measurement error range of the second temperature sensor with reference to a second temperature indicated by the second temperature digital value, the comparator outputs a signal indicating that the first temperature sensor is normal.

5. The temperature measurement circuit according to claim 1, wherein a temperature measurement accuracy of the first temperature sensor is higher than a temperature measurement accuracy of the second temperature sensor.

6. The temperature measurement circuit according to claim 1, wherein the second temperature sensor further comprises a counter which counts the oscillating signals output by the ring oscillator in a predetermined period by using a reference signal, a cycle of which is not temperature dependent.

7. The temperature measurement circuit according to claim 1, wherein the second temperature sensor further comprises a built-in self-test circuit.

8. A micro computer unit comprising:
a first temperature sensor comprising a temperature detection unit including a resistive element, a resistance value of which varies in accordance with temperature changes, and an analog to digital converter which converts a voltage value of the resistive element into a first temperature digital value;
a second temperature sensor comprising a ring oscillator which oscillates at a cycle that is temperature dependent, the second temperature sensor configured to generate a second temperature digital value based on an oscillating signal output by the ring oscillator; and
a comparator configured to compare the first temperature digital value with the second temperature digital value, and configured to output a signal indicating whether the first temperature sensor is normal or not based on a comparison result.

9. The micro computer unit according to claim 8, further comprising:
a processor; and
a memory capable of being read out from the processor,
wherein the second temperature sensor further comprises
a second temperature data register configured to store the second temperature digital value, and
the processor refers to the second temperature digital value stored in the second temperature data register via a data bus.

10. The micro computer unit according to claim 8,
wherein the oscillating signal output by the comparator and indicating whether the first temperature sensor is normal or not is output to an external peripheral circuit through an external terminal.

11. The micro computer unit according to claim 8, further comprising:
a processor; and
a memory capable of being read out from the processor,
wherein the first temperature sensor further comprises a logic unit including a first temperature data register configured to store the first temperature digital value, and
the processor refers to the first temperature digital value stored in the first temperature data register via a data bus.

12. The micro computer unit according to claim 11,
wherein the logic unit further includes a built-in self-test circuit, and
the processor causes a self-test in the logic unit to be executed by operating the built-in self-test circuit.

13. The micro computer unit according to claim 8, further comprising:
a processor; and
a memory capable of being read out from the processor,
wherein the processor respectively determines if a first temperature indicated by the first temperature digital value and a second temperature indicated by the second temperature digital value are equal to or lower than a first temperature threshold value corresponding to a lower limit of a predetermined range, or equal to or greater than a second temperature threshold value corresponding to an upper limit of the predetermined range.

14. The micro computer unit according to claim 13,
wherein when at least one of the first temperature and the second temperature are equal to or lower than the first temperature threshold value or equal to or greater than the second temperature threshold value, the processor executes a predetermined process.

15. The micro computer unit according to claim 8, further comprising:
a processor; and
a memory capable of being read out from the processor,
wherein the second temperature sensor further includes a built-in self-test circuit, and
the processor causes a self-test in the second temperature sensor to be executed by operating the built-in self-test circuit.

16. The micro computer unit according to claim 15,
wherein the processor causes the built-in self-test circuit of the second temperature sensor to operate at least once in an operating cycle from an initiation of a process to a completion of the process.

17. A temperature measurement method comprising:
converting a voltage value of a resistive element included in a first temperature sensor into a first temperature digital value, wherein a resistance value of the resistive element varies in accordance with temperature changes;
generating a second temperature digital value based on an oscillating signal output by a ring oscillator included in a second temperature sensor, the ring oscillator oscillating at a cycle that is temperature dependent;
comparing the first temperature digital value with the second temperature digital value; and
outputting a signal indicating whether the first temperature sensor is normal or abnormal based on a comparison result.

* * * * *